United States Patent
Ooshima

(10) Patent No.: US 11,359,717 B2
(45) Date of Patent: Jun. 14, 2022

(54) SELECT CONTROL DEVICE OF AUTOMATIC TRANSMISSION

(71) Applicants: JATCO LTD, Fuij (JP); Nissan Motor Co., Ltd., Yokohama (JP)

(72) Inventor: Kenichi Ooshima, Isehara (JP)

(73) Assignees: Jatco Ltd., Fuji (JP); NISSAN MOTOR CO., LTD., Yokohama (JP)

( * ) Notice: Subject to any disclaimer, the term of this patent is extended or adjusted under 35 U.S.C. 154(b) by 812 days.

(21) Appl. No.: 16/320,527

(22) PCT Filed: Jul. 27, 2017

(86) PCT No.: PCT/JP2017/027273
§ 371 (c)(1),
(2) Date: Jan. 25, 2019

(87) PCT Pub. No.: WO2018/025747
PCT Pub. Date: Feb. 8, 2018

(65) Prior Publication Data
US 2019/0271389 A1    Sep. 5, 2019

(30) Foreign Application Priority Data

Aug. 3, 2016 (JP) .............................. JP2016-153061

(51) Int. Cl.
*F16H 61/00* (2006.01)
*F16H 59/10* (2006.01)
(Continued)

(52) U.S. Cl.
CPC ......... *F16H 61/0021* (2013.01); *F16H 59/08* (2013.01); *F16H 59/10* (2013.01);
(Continued)

(58) Field of Classification Search
CPC ................. F16H 61/0021; F16H 59/70; F16H 2061/0481
See application file for complete search history.

(56) References Cited

U.S. PATENT DOCUMENTS 5,224,399 A * 7/1993 Baba ........................ F16H 61/04
192/109 F
6,007,456 A * 12/1999 Takiguchi ................. F16H 3/66
475/128
(Continued)

FOREIGN PATENT DOCUMENTS

JP        2002-323122 A      11/2002

*Primary Examiner* — Terence Boes
(74) *Attorney, Agent, or Firm* — Global IP Counselors, LLP

(57) ABSTRACT

A select control device for an automatic transmission includes a select lever and a controller. The select lever is configured to select a range position in response to a select operation by a driver. The controller is configured to, when a first select operation from a first travel range position to a non-travel range position is performed, perform pressure release control that decreases at a prescribed descending gradient an engagement capacity of a starting clutch that is engaged in the first travel range position. The controller has a select hydraulic pressure control unit configured to continue the pressure release control during a second select operation from a second travel range position that is different from the first travel range position to the non-travel range position after the first select operation.

5 Claims, 10 Drawing Sheets

(51) Int. Cl.
　　　　*F16H 61/686*　　　(2006.01)
　　　　*F16H 61/02*　　　　(2006.01)
　　　　*F16H 59/08*　　　　(2006.01)
　　　　*F16H 61/04*　　　　(2006.01)
　　　　*F16H 59/70*　　　　(2006.01)

(52) U.S. Cl.
　　　　CPC ............ *F16H 61/02* (2013.01); *F16H 61/04* (2013.01); *F16H 61/686* (2013.01); *F16H 59/70* (2013.01)

(56) References Cited

U.S. PATENT DOCUMENTS

| | | | |
|---|---|---|---|
| 11,110,930 B2* | 9/2021 | Matsuo | B60W 30/19 |
| 2002/0198647 A1* | 12/2002 | Kawamoto | F16H 61/061 |
| | | | 701/54 |
| 2010/0095796 A1* | 4/2010 | Nakamura | F16H 61/0437 |
| | | | 74/473.33 |
| 2015/0020632 A1* | 1/2015 | Nagata | F16H 61/0437 |
| | | | 74/473.11 |
| 2018/0031125 A1* | 2/2018 | Chimbe | F16H 61/686 |
| 2018/0264973 A1* | 9/2018 | Mochizuki | B60K 6/48 |
| 2019/0092334 A1* | 3/2019 | Demain | B60W 10/196 |
| 2019/0264802 A1* | 8/2019 | Okumura | F16H 59/48 |

\* cited by examiner

ENGAGEMENT TABLE

| STAGE NUMBER | B1 (REV CLUTCH) | B2 | B3 | K1 | K2 | K3 (FWD CLUTCH) |
|---|---|---|---|---|---|---|
| 1 |  | ● | ● |  |  | ● |
| 2 |  | ● |  |  | ● | ● |
| 3 |  | ● | ● |  | ● |  |
| 4 |  | ● | ● | ● |  |  |
| 5 |  |  | ● | ● | ● |  |
| 6 |  |  |  | ● | ● | ● |
| 7 |  |  | ● | ● |  | ● |
| 8 | ● |  |  | ● |  | ● |
| 9 | ● |  | ● | ● |  |  |
| Rev | ● | ● | ● |  |  |  |
| N,P RANGE |  |  |  |  |  |  |

Fig. 3

SELECT CONTROL DEVICE OF AUTOMATIC TRANSMISSION

CROSS-REFERENCE TO RELATED APPLICATIONS

This is a U.S. national phase application of PCT/JP2017/027273, filed on Jul. 27, 2017, which claims priority to Japanese Patent Application No. 2016-153061, filed on Aug. 3, 2016. The entire disclosure of Japanese Patent Application No. 2016-153061 is hereby incorporated herein by reference.

TECHNICAL FIELD

The present invention relates to a select control device of an automatic transmission that suppresses select shock when a driver performs a select operation.

BACKGROUND ART

Conventionally, a hydraulic pressure control device of an automatic transmission is known that, during a D→1 select operation from a D range position to an N range position, the hydraulic pressure of the released clutch is decreased by a designated profile, suppressing select shock (see Japanese Laid-Open Patent Publication No. 2002-323122).

However, in the conventional device noted above, when a driver performs the select operation from the D range position to the P range position, the range position of the select lever moving from D→N→R→P is detected. Thus, there was the problem that, even if hydraulic pressure control is performed based on the D→N select operation, by the R→P select operation entering at the end, the clutch that was engaged at the D range position suddenly loses hydraulic pressure, and there are cases when select shock occurs.

SUMMARY

The present invention was created with a focus on the abovementioned problem, and its purpose is to suppress select shock when the driver performs a continuous select operation repeating the range position detection of a travel range and a non-travel range.

To achieve the purpose noted above, the present invention comprises: a select lever for selecting a range position by the select operation of a driver; and a controller.

When a first select operation from a first travel range position to a non-travel range position is performed, the controller performs pressure release control to gently decrease the engagement capacity of the starting clutch that is engaged in the first travel range position.

In this select control device of an automatic transmission, the controller has a select hydraulic pressure control unit that, after the first select operation, at the time of a second select operation from a first travel range position to a non-travel range position from a second travel range position that is different from the first travel range position, continues the pressure release control.

As a result, it is possible to suppress select shock when the driver performs a continuous select operation that repeats range position detection of the travel range and the non-travel range.

BRIEF DESCRIPTION OF THE DRAWINGS

FIG. 3 is a drawing showing an engagement table with each shift stage of friction elements for shifting with the automatic transmission to which the select control device of Embodiment 1 is applied.

DETAILED DESCRIPTION OF EMBODIMENTS

Figure 1:
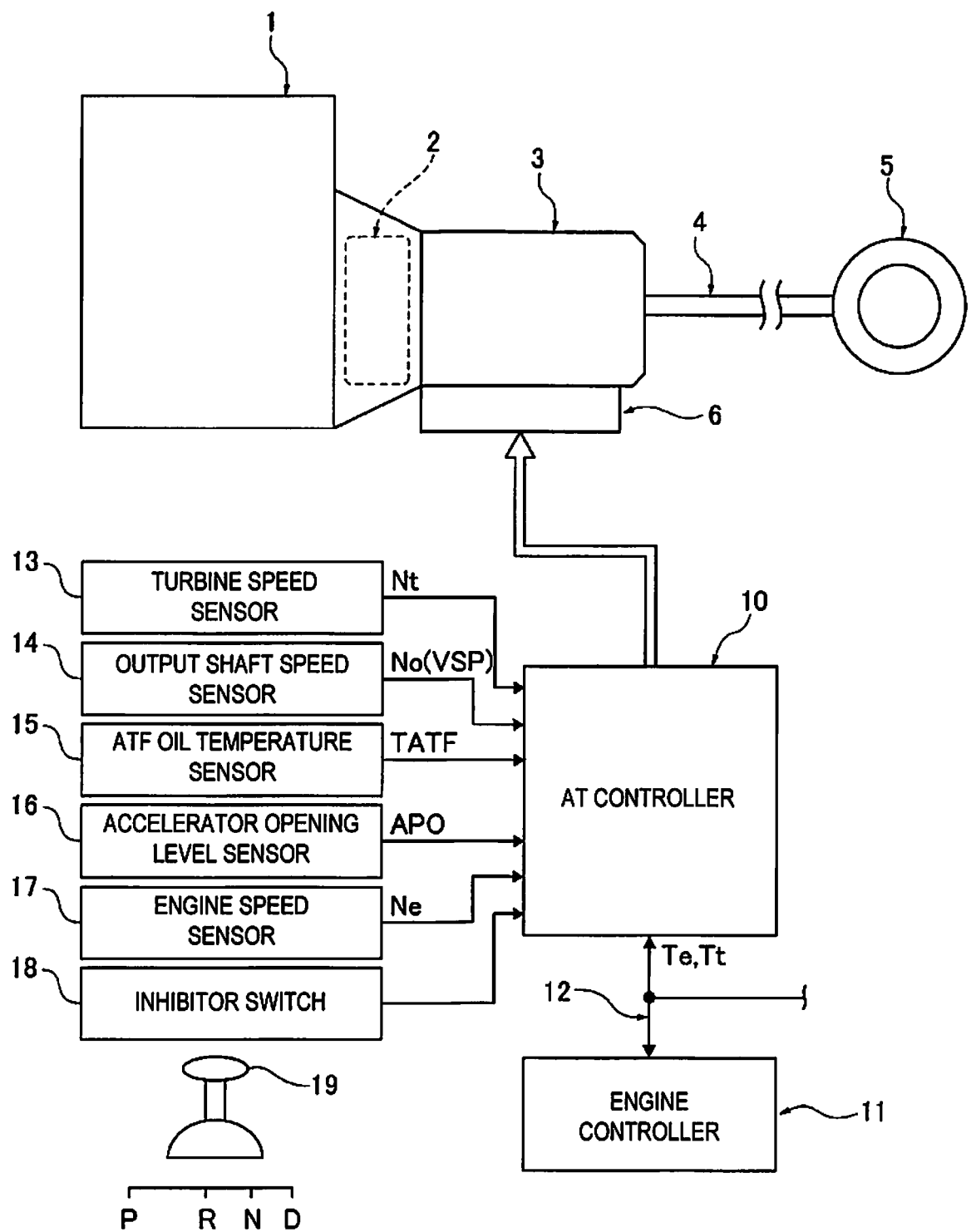
FIG. 1 is an overall system diagram showing an engine vehicle in which is mounted an automatic transmission to which a select control device of Embodiment 1 is applied.

Following, a preferred mode for realizing the select control device of an automatic transmission of the present invention is explained based on Embodiment 1 shown in the drawings.

Embodiment 1

First, the configuration is explained.

A select control device of Embodiment 1 is used for an engine vehicle in which an automatic transmission is mounted for realizing shift stages of nine forward speeds and one reverse speed. Following, the configuration of the select control device of an automatic transmission of Embodiment 1 is explained divided into "Overall System Configuration," "Detailed Configuration of Automatic Transmission," "Select Hydraulic Pressure Control Process Configuration," and "Capacity Existence Determination Process Configuration."

[Overall System Configuration]

FIG. 1 shows an engine vehicle in which is mounted an automatic transmission to which the select control device of Embodiment 1 is applied. Hereafter, the overall system configuration is explained based on FIG. 1.

As shown in FIG. 1, a drive system of the engine vehicle comprises: an engine 1, a torque converter 2, an automatic transmission 3, a propeller shaft 4, and a drive wheel 5. Attached to the automatic transmission 3 is a control valve unit 6 using a spool valve, hydraulic pressure circuit, solenoid valve, etc., for shifting. This control valve unit 6 receives a control command from an AT controller 10 to operate.

As shown in FIG. 1, a control system of the engine vehicle comprises: the AT controller 10, an engine controller 11, and a CAN communication line 12.

The AT controller 10 inputs signals from a turbine shaft speed sensor 13, an output shaft speed sensor 14, an ATF oil temperature sensor 15, an accelerator opening level sensor 16, an engine speed sensor 17, an inhibitor switch 18, etc. The turbine shaft speed sensor 13 detects the turbine speed (=transmission input shaft speed) of the torque converter 2, and sends a signal of a turbine shaft speed Nt to the AT controller 10. The output shaft speed sensor 14 detects the transmission output shaft speed (=vehicle speed VSP) of the automatic transmission 3, and sends a signal of an output shaft speed No. (VSP) to the AT controller 10. The ATF oil temperature sensor 15 detects the temperature of the ATF (oil for automatic transmission), and sends a signal of the ATF oil temperature TATF to the AT controller 10. The accelerator opening level sensor 16 detects the accelerator opening level by a driver operation, and sends a signal of an accelerator opening level APO to the AT controller 10. The engine speed sensor 17 detects the speed of the engine 1, and sends a signal of engine speed Ne to the AT controller 10. The inhibitor switch 18 detects a range position selected by a select operation to the select lever 19 by the driver, and sends a range position signal to the AT controller 10. The placements of the range position are, in order from the right side in FIG. 1, a D range position (travel range position), an N range position (non-travel range position), an R range position (travel range position), and a P range position (non-travel range position).

The engine controller 11 performs various controls of the engine 1, and information of an engine torque Te or a turbine torque Tt is brought from this engine controller 11 via the CAN communication line 12 to the AT controller 10.

Detailed Configuration of Automatic Transmission

Figure 2:
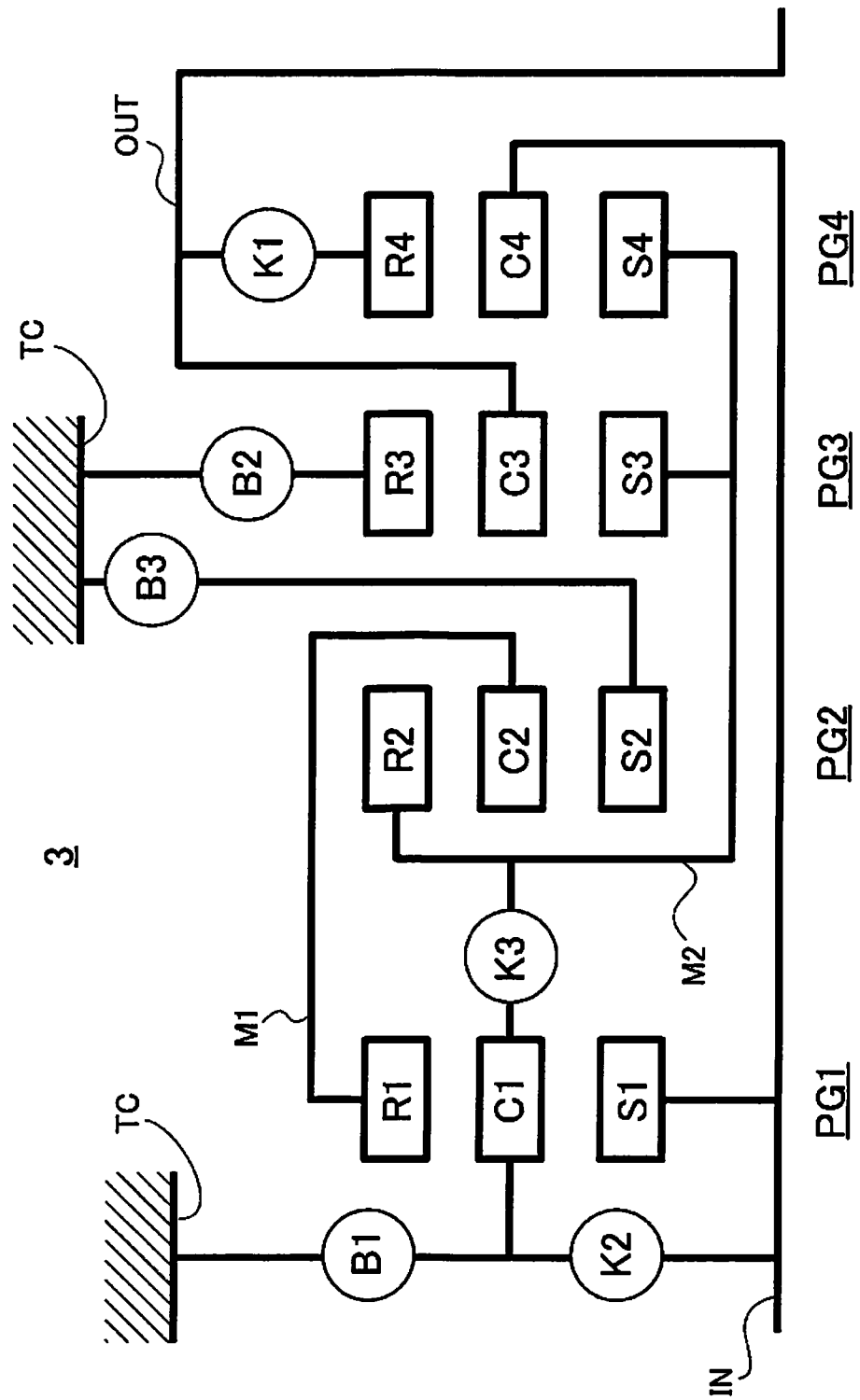
FIG. 2 is a skeleton diagram showing an example of an automatic transmission to which the select control device of Embodiment 1 is applied.
Figure 4:
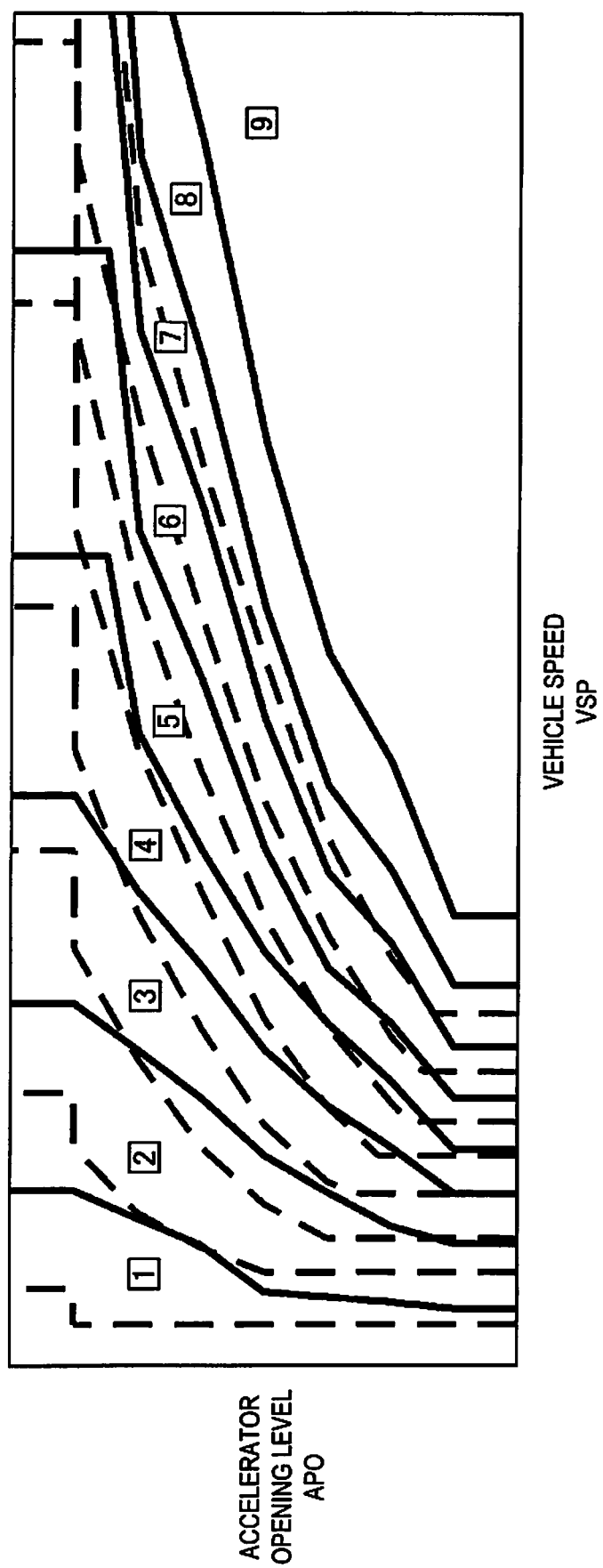
FIG. 4 is a shift map diagram showing an example of the shift map with the automatic transmission to which the select control device of Embodiment 1 is applied.

FIG. 2 is a skeleton diagram showing an example of the automatic transmission 3 to which the select control device of Embodiment 1 is applied, FIG. 3 is an engagement table of the automatic transmission 3, and FIG. 4 shows an example of a shift map with the automatic transmission 3. Following, the detailed configuration of the automatic transmission 3 is explained based on FIG. 2 to FIG. 4.

As shown in FIG. 2, the automatic transmission 3 comprises a first planetary gear PG1, a second planetary gear PG2, a third planetary gear PG3, and a fourth planetary gear PG4 in order facing an output shaft OUT from an input shaft IN as planetary gears configuring a gear train.

The first planetary gear PG1 is a single pinion type planetary gear, and has a first sun gear S1, a first carrier C1 supporting a pinion meshed to the first sun gear S1, and a first ring gear R1 meshed to the pinion.

The second planetary gear PG2 is a single pinion type planetary gear, and has a second sun gear S2, a second carrier C2 supporting a pinion meshed to the second sun gear S2, and a second ring gear R2 meshed to the pinion.

The third planetary gear PG3 is a single pinion type planetary gear, and has a third sun gear S3, a third carrier C3 supporting a pinion meshed to the third sun gear S3, and a third ring gear R3 meshed to the pinion.

The fourth planetary gear PG4 is a single pinion type planetary gear, and has a fourth sun gear S4, a fourth carrier C4 supporting a pinion meshed to the fourth sun gear S4, and a fourth ring gear R4 meshed to the pinion.

As shown in FIG. 2, the automatic transmission 3 comprises: the input shaft IN, the output shaft OUT, a first connection member M1, a second connection member M2, and a transmission case TC. As friction elements that are engaged and released by shifting, comprised are a first brake B1, a second brake B2, a third brake B3, a first clutch K1, a second clutch K2, and a third clutch K3.

The input shaft IN is a shaft for which driving force from the engine 1 is input via the torque converter 2, and is always connected with the first sun gear S1 and the fourth carrier C4. Also, the input shaft IN is connected to be disconnectable with the first carrier C1 via the second clutch K2.

The output shaft OUT is a shaft for outputting drive torque shifted to the drive wheel 5 via the propeller shaft 4 and a final gear, etc., outside the drawing, and is always connected to the third carrier C3. Also, the output shaft OUT is connected to be disconnectable with the fourth ring gear R4 via the first clutch K1.

The first connection member M1 is a member that always connects the first ring gear R1 of the first planetary gear PG1 and the second carrier C2 of the second planetary gear PG2 without interposing the friction element. The second connection member M2 is a member that always connects the second ring gear R2 of the second planetary gear PG2, the third sun gear S3 of the third planetary gear PG3, and the fourth sun gear S4 of the fourth planetary gear PG4 without interposing the friction element.

The first brake B1 is the friction element with which the rotation of the first carrier C1 can be locked to the transmission case TC. The second brake B2 is the friction element with which the rotation of the third ring gear R3 can be locked to the transmission case TC. The third brake B3 is the friction element with which the rotation of the second sun gear S2 can be locked to the transmission case TC.

The first clutch K1 is the friction element that selectively connects between the fourth ring gear R4 and the output shaft OUT. The second clutch K2 is the friction element that selectively connects between the input shaft IN and the first carrier C1. The third clutch K3 is the friction element that selectively connects between the first carrier C1 and the second connection member M2.

The shift configuration for establishing each shift stage is explained based on FIG. 3 that shows the engagement table for achieving nine forward speeds and one reverse speed in the D range by combining simultaneous engagement of three of the six friction elements in the automatic transmission 3.

As shown in FIG. 3, first gear ($1^{st}$) is achieved by simultaneous engagement of the second brake B2, the third brake B3, and the third clutch K3. As shown in FIG. 3, second gear ($2^{nd}$) is achieved by simultaneous engagement of the second brake B2, the second clutch K2, and the third clutch K3. As shown in FIG. 3, third gear ($3^{rd}$) is achieved by simultaneous engagement of the second brake B2, the third brake B3, and the second clutch C2. As shown in FIG. 3, fourth gear ($4^{th}$) is achieved by simultaneous engagement of the second brake B2, the third brake B3, and the first clutch K1. As shown in FIG. 3, fifth gear ($5^{th}$) is achieved by simultaneous engagement of the third brake B3, the first clutch K1, and the second clutch K2. The above first gear to fifth gear are under drive shift stages using a deceleration gear ratio for which the gear ratio exceeds 1.

As shown in FIG. 3, sixth gear ($6^{th}$) is achieved by simultaneous engagement of the first clutch K1, the second clutch K2, and the third clutch K3. As shown in FIG. 3, seventh gear ($7^{11}$) is achieved by simultaneous engagement of the third brake B3, the first clutch K1, and the third clutch K3. As shown in FIG. 3, eighth gear ($8^{th}$) is achieved by simultaneous engagement of the first brake B1, the first clutch K1, and the third clutch K3. As shown in FIG. 3, ninth gear ($9^{th}$) is achieved by simultaneous engagement of the first brake B1, the third brake B3, and the first clutch K1. Of the above sixth gear to ninth gear, sixth gear is a direct engagement stage for which the gear ratio=1, and seventh gear to ninth gear are overdrive shift stages using an acceleration gear ratio for which the gear ratio is less than 1.

Furthermore, of the shift stages from first gear to ninth gear, when performing an upshift to the adjacent shift stage, or when performing a downshift, as shown in FIG. 3, the configuration is such that this is performed using a change-over shift. Specifically, when shifting to the adjacent shift stage, of the three friction elements, with the engagement of two friction elements maintained as is, release of one friction element and engagement of one friction element are performed.

Also, the shift map shown in FIG. 4 is stored and set in the AT controller 10, and shifting by switching shift stages from the first gear to the ninth gear of the forward side is performed according to this shift map. Specifically, when the upshift line shown by the solid line in FIG. 4 is crossed by the operating points (VSP, APO) at that time, an upshift shift command is output. Also, when a downshift line shown by the dotted line of FIG. 4 is crossed by the operating points (VSP, APO), a downshift shift command is output.

As shown in FIG. 3, the reverse gear (Rev) by selection of the R range position is achieved by simultaneous engagement of the first brake B1, the second brake B2, and the third brake B3. When the N range position and the P range position are selected, all of the six friction elements B1, B2, B3, K1, K2, and K3 are in a released state. With the explanation hereafter, the friction element K3 that is engaged with the first gear ($1^{st}$) in the D range and released with the reverse gear (Rev) in the R range is called "forward clutch 20 (FWD/C)." Also, the friction element B1 that is engaged with the reverse gear (Rev) in the R range and released with the first gear ($1^{st}$) in the D range is called "reverse clutch 21 (REV/C)."

Select Hydraulic Pressure Control Process Configuration

Figure 5:
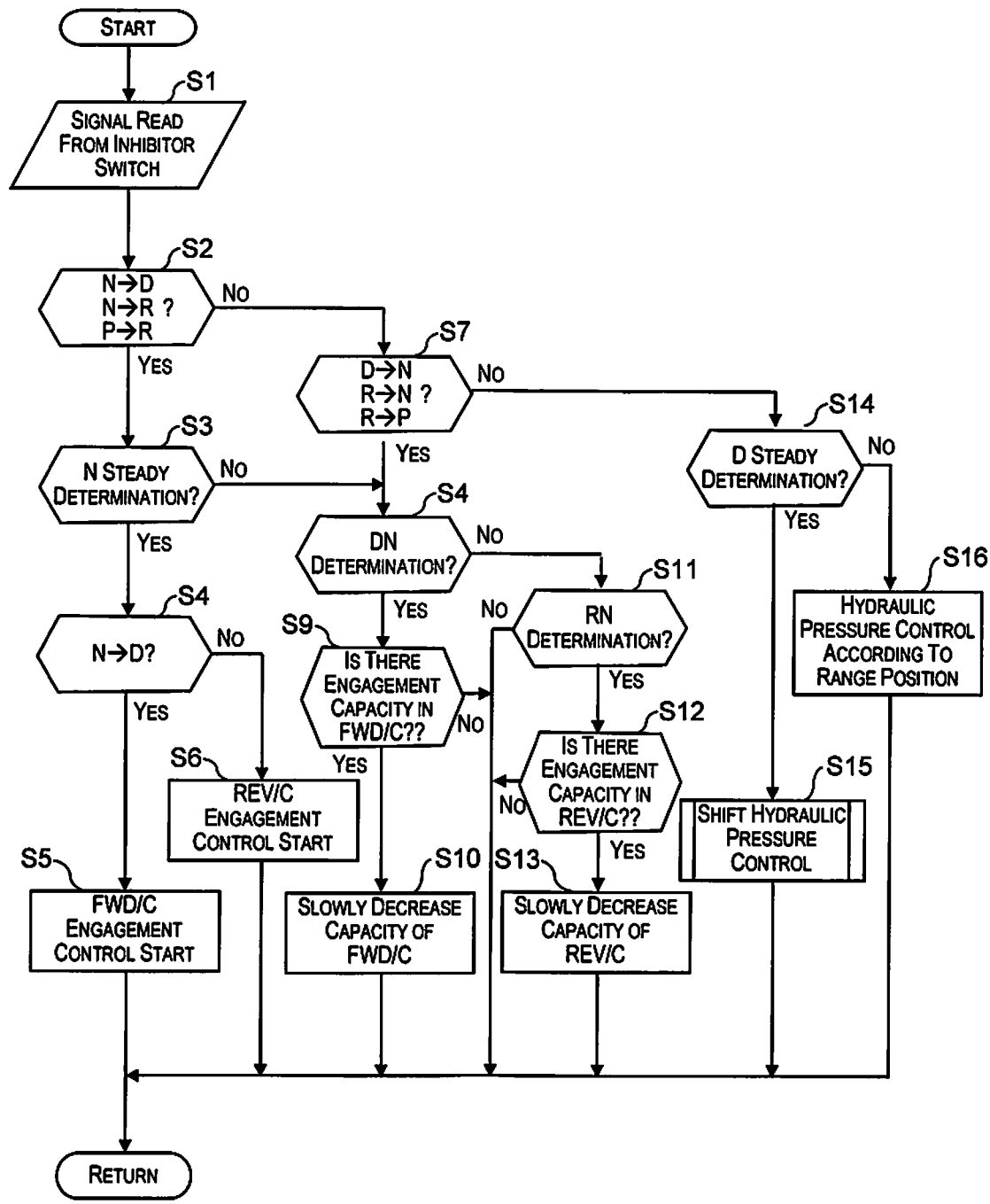
FIG. 5 is a flow chart showing the flow of the select hydraulic pressure control process executed with an AT controller of Embodiment 1.

FIG. 5 is a flow chart showing the flow of the select hydraulic pressure control process executed by the AT controller 10 of Embodiment 1 (select hydraulic pressure control unit). Hereafter, each step of FIG. 5 representing the select hydraulic pressure control process configuration is explained.

At step S1, the switch signal indicating the range position is read from the inhibit switch 18, and the process advances to step S2.

At step S2, after reading the range position signal at step S1, a judgment is made of whether it is any of the N→D select time, the N→R select time, or the P→R select time. When YES (any of N→D, N→R, or P→R), the process advances to step S3, and when NO (other than N→D, N→R, or P→R), the process advances to step S7.

Here, when the range position read the previous time is in the non-travel range (N, P), and the range position read this time is in the travel range (D, R), a select operation judgment from the non-travel range (N, P) to the travel range (D, R) is performed.

Figure 6:
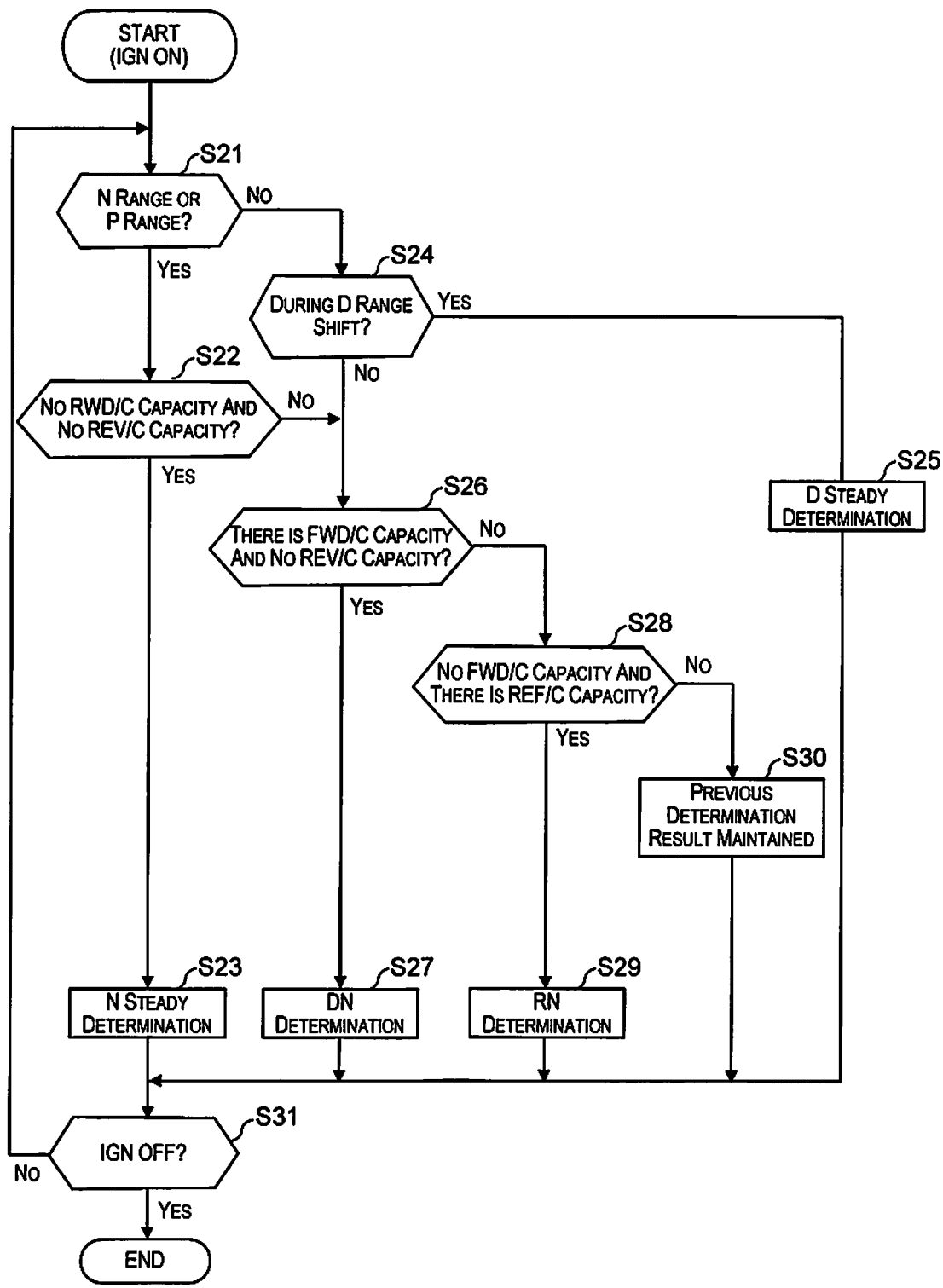
FIG. 6 is a flow chart showing the flow of a determination process for the select hydraulic pressure control executed by the AT controller of Embodiment 1.

At step S3, following the judgment of whether any of N→D, N→R, or P→R at step S2, a judgment is made of whether there is an "N steady determination" by the capacity existence determination process of FIG. 6. When YES ("N steady determination"), the process advances to step S4, and when NO (other than "N steady determination"), the process advances to step S8.

At step S4, following the judgment that this is "N steady determination" at step S3, a judgment is made of whether this is the N→D select time. When YES (N→D), the process advances to step S5, and when NO (N→R, P→R), the process advances to step S6.

At step S5, following the judgment that this is an N→D select time at step S4, the engagement control of the forward clutch 20 starts, and the process advances to Return.

At step S6, following the judgment that this is an N→R select time or a P→R select time at step S4, the engagement control of the reverse clutch 21 starts, and the process advances to Return.

At step S7, following the judgment that this is other than N→D, N→R, or P→R at step S2, a judgment is made of whether this is any of the D→N select time, R→N select time, or R→P select time. When YES (any of D→N, R→N, or R→P), the process advances to step S8, and when NO (other than D→N, R→N, or R→P), the process advances to step S14.

Here, when the range position read the previous time is in the travel range (D, R) and the range position read this time is in the non-travel range (N, P), a select operation judgment from the travel range (D, R) to the non-travel range (N, P) is performed.

At step S8, following the judgment that this is other than "N steady determination" at step S3, or the judgment that it is any of D→N, R→N, or R→P at step S7, a judgment is made of whether this is "DN determination" by the capacity existence determination process of FIG. 6. When YES ("DN determination"), the process advances to step S9, and when NO (other than "DN determination"), the process advances to step S11.

At step S9, following the judgment of "DN determination" at step S8, a judgment is made of whether there is engagement capacity in the forward clutch 20. When YES (there is FWD/C engagement capacity), the process advances to step S10, and when NO (there is no FWD/C engagement capacity), the process advances to Return.

At step S10, following the judgment that there is FWD/C engagement capacity at step S9, control is executed to decrease at a prescribed descending gradient the engagement capacity of the forward clutch 20, and the process advances to Return.

At step S11, following the judgment of other than "DN determination" at step S8, a judgment is made of whether this is "RN determination" by the capacity existence determination process of FIG. 6. When YES ("RN determination"), the process advances to step S12, and when NO (other than "RN determination"), the process advances to Return.

At step S12, following the judgment of "RN determination" at step S11, a judgment is made of whether there is engagement capacity in the reverse clutch 21. When YES (there is REV/C engagement capacity), the process advances to step S13, and when NO (there is no FWD/C engagement capacity), the process advances to Return.

At step S13, following the judgment that there is REV/C engagement capacity at step S12, control is executed to slowly decrease the engagement capacity of the reverse clutch 21, and the process advances to Return.

At step S14, following the judgment of other than D→N, R→N, or R→P at step S7, a judgment is made of whether this is "D steady determination" by the capacity existence determination process of FIG. 6. When YES ("D steady determination"), the process advances to step S15, and when NO (other than "D steady determination"), the process advances to step S16.

At step S15, following the judgment of "D steady determination" at step S14, shift hydraulic pressure control of the automatic transmission 3 is executed according to an upshift request or a downshift request, and the process advances to Return.

At step S16, following the judgment of other than "D steady determination" at step S14, hydraulic pressure control (pressure input control, pressure release control) is executed according to the selected range position and "DN determination" or "RN determination," and the process advances to Return.

Capacity Existence Determination Process Configuration

FIG. 6 is a flow chart (capacity existence determination part) showing the flow of the capacity existence determination process executed by the AT controller 10 of Embodiment 1. Hereafter, each step of FIG. 6 representing the capacity existence determination process configuration is explained.

At step S21, following the judgment of a start by the ignition switch being ON, or that the ignition switch is ON at step S31, a judgment is made of whether the currently selected range position is the N range position or P range position. When YES (N or P), the process advances to step S22, and when NO (other than N, P), the process advances to step S24.

At step S22, following the judgment that this is the N range position or the P range position at step S21, a judgment is made of whether there is no engagement capacity in the forward clutch 20, and whether there is no engagement capacity in the reverse clutch 21. When YES (no FWD/C capacity and no REV/C capacity), the process advances to step S23, and when NO (other than no FWD/C capacity and no REV/C capacity), the process advances to step S26.

At step S23, following the judgment that there is no FWD/C capacity and no REV/C capacity at step S22, the determination result is set to "N steady determination," and the process advances to step S31.

Here, "N steady determination" is an expression that includes "P steady determination" since all the friction elements are released in the N range position and the P range position. When the determination result is "N steady determination," the "N steady determination" is maintained until this next becomes "DN determination" or "RN determination."

At step S24, following the judgment that this is other than the N range position or P range position at step S21, a judgment is made of whether this is during a D range shift. When YES (is during a D range shift), the process advances to step S25, and when NO (other than during a D range shift), the process advances to step S26.

Here, after selection of the D range position and being set to the forward first gear, a judgment is made that the time during the automatic shift according to the upshift request or the downshift request is "during a D range shift." In other words, until moved to the forward first gear is judged to be "other than during a D range shift."

At step S25, following the judgment of being during a D range shift at step S24, the determination result is made to be "D steady determination," and the process advances to step S31.

At step S26, following the judgment of being other than no FWD/C capacity and no REV/C capacity at step S22, or the judgment of being other than during D range shift at step S24, a judgment is made of whether there is engagement capacity in the forward clutch 20, and if there is no engagement capacity in the reverse clutch 21. When YES, (there is FWD/C capacity and there is no REV/C capacity), the process advances to step S27, and when NO (other than there is FWD/C capacity and there is no REV/C capacity), the process advances to step S28.

At step S27, following the judgment of there is FWD/C capacity and there is no REV/C capacity at step S26, the determination result is made to be "DN determination," and the process advances to step S31.

Here, "DN determination" is an expression that includes "DP determination" from the fact that all the friction elements are released in the N range position and the P range position.

At step S28, following the judgment of this being other than there is FWD/C capacity and there is no REV/C capacity at step S26, a judgment is made of whether there is no engagement capacity in the forward clutch 20 and there is engagement capacity in the reverse clutch 21. When YES (there is no FWD/C capacity and there is REV/C capacity), the process advances to step S29, and when NO (other than there is no FWD/C capacity and there is REV/C capacity), the process advances to step S30.

At step S29, following the judgment that there is no FWD/C capacity and there is REV/C capacity at step S28, the determination result is made to be "RN determination," and the process advances to step S31.

Here, "RN determination" is an expression that includes "RP determination" from the fact that all the friction elements are released in the N range position and the P range position.

At step S30, following the judgment of being other than no FWD/C capacity and there is REV/C capacity at step S28, in other words, after the judgment that there is no FWD/C capacity and there is no REV/C capacity, the previous determination result is maintained, and the process advances to step S31.

At step S31, following the capacity determinations at steps S23, S25, S27, S29, and S30, a judgment is made of whether the ignition switch is OFF. When YES (ignition switch is OFF), the process advances to End, and when NO (the ignition switch is ON), the process returns to step S21.

Next, the operation is explained.

The operation of Embodiment 1 is explained divided into the "Select Hydraulic Pressure Control Process Operation," the "Capacity Existence Determination Process Operation," the "Select Hydraulic Pressure Control Operation During the Continuous Select Operation," and the "Characteristics Operation with Select Hydraulic Pressure Control."

Select Hydraulic Pressure Control Process Operation

Hereafter, based on the flow chart of FIG. 5, explained is the select hydraulic pressure control process operation performed using the capacity existence determination results ("N steady determination," "DN determination," "RN determination," "D steady determination").

When the N range position is selected with an intention to make a forward start from the stopped state, when the select operation is performed by moving the select lever 19 to the D range position, in the flow chart of FIG. 5, there is an advance from step S1→step S2→step S3→step S4→step S5. At step S5, engagement control of the forward clutch 20 starts, the automatic transmission 3 is in the shift stage of the D range first gear, and it is possible to make a forward start.

When the N range position or the P range position is selected with the intention of doing a reverse start from a stopped state, and the select operation is performed of moving the select lever 19 to the R range position, in the flow chart of FIG. 5, there is an advance from step S1→step S2→step S3→step S4→step S6. At step S6, engagement control of the reverse clutch 21 starts, the automatic transmission 3 is in the R range, and it is possible to do a reverse start.

The D range position is selected with the intention of decelerating or stopping from a forward travel state, and a select operation is performed of operating the select lever 19 to the N range position. At this time, this is "DN determination," and when there is engagement capacity in the forward clutch 20, in the flow chart in FIG. 5, the process advances from step S1→step S2→step S7→step S8→step S9→step S10. At step S10, control is executed to slowly decrease the engagement capacity of the forward clutch 20.

The R range position is selected with the intention of decelerating or stopping from a reverse travel state, and a select operation is performed of moving the select lever 19 to the N range position or the P range position. At this time, this is "RN determination," and when there is engagement capacity in the reverse clutch 21, in the flow chart in FIG. 5, the process advances from step S1→step S2, step S7→step S8→step S11→step S12→step S13. At step S13, control is executed to slowly decrease the engagement capacity of the reverse clutch 21.

When in a forward travel state and the range position is held in the D range position, and this is "D steady determination," in the flow chart in FIG. 5, the process advances from step S1→step S2→step S7→step S14→step S15. At step S15, shift hydraulic pressure control of the automatic transmission 3 is executed according to an upshift request or a downshift request.

When there is no select operation, and when other than "D steady determination," in the flow chart of FIG. 5, the process advances from step S1→step S2→step S7→step S14→step S16. At step S16, hydraulic pressure control (pressure input control, pressure release control) is executed according to the selected range position and "DN determination" or "RN determination."

When the D range position is selected with the intention to stop from a forward travel state, and the continuous select operation is performed to move the select lever 19 to the P range position, as is clear from FIG. 1, the range position signal from the inhibitor switch 18 changes to "D→N→R→P." Dividing the switching of the range position signals at this time, this becomes a combination of switching of the range position by "D→N" and "N→R" and "R→P." Here, as with "D→N" and "R→P," the P→D select operation that repeats the range position detection of the travel range (D, R) and the non-travel range (N, P) is called the "continuous select operation."

When "D→N" is detected with the continuous select operation, when this is "DN determination," and there is engagement capacity in the forward clutch 20, in the flow chart in FIG. 5, the process advances from step S1→step S2→step S7→step S8→step S9→step S10. At step S10, control is executed to slowly decrease the engagement capacity of the forward clutch 20.

When "N→R" is detected with the continuous select operation, when this is "DN determination," and there is engagement capacity in the forward clutch 20, in the flow chart of FIG. 5, the process advances from step S1→step S2→step S3→step S8→step S9 step S10. At step S10, control is executed to slowly decrease the engagement capacity of the forward clutch 20.

When "R→P" is detected with the continuous select operation, this is "RN determination," and there is engagement capacity in the reverse clutch 21. At this time, in the flow chart of FIG. 5, the process advances from step S1→step S2→step S7→step S8→step S11→step S12→step S13. At step S13, control is executed to slowly decrease the engagement capacity of the reverse clutch 21.

Meanwhile, when "R→P" is detected with the continuous select operation, this remains as "DN determination," and there is engagement capacity in the forward clutch 20. At this time, in the flow chart of FIG. 5, the process advances from step S1→step S2→step S7→step S8→step S9→step S10. At step S10, control is executed to slowly decrease the engagement capacity of the forward clutch 20.

Capacity Existence Determination Process Operation

Hereafter, the capacity existence determination process operation to output the capacity existence determination results ("N steady determination," "DN determination," "RN determination," "D steady determination") used with the select hydraulic pressure control process is explained based on the flow chart of FIG. 6.

When the ON operation is done for the ignition switch from the stopped state in the N or P range position, by there being no engagement capacity for both the forward clutch 20 and the reverse clutch 21, in the flow chart FIG. 6, the process advances from step S21→step S22→step S23. At step S23, "N steady determination" is set as the capacity existence determination result.

When in forward travel with the D range position selected, and the automatic transmission 3 is during the D range shift, in the flow chart in FIG. 6, the process advances from step S21→step S24→step S25. At step S25, "D steady determination" is set as the capacity existence determination result.

When doing a select operation from the N or P range position to the D range position, forward clutch engagement control to increase the engagement capacity to the forward clutch 20 is started. Even when the forward clutch engagement control is started, until it is judged that there is capacity for the forward clutch 20, in the flow chart of FIG. 6, the process advances from step S21→step S24→step S26→step S28→step S30. At step S30, the previous determination result, specifically, the "N steady determination," is maintained.

When forward clutch engagement control is started, capacity control is entered from standby control, and a judgment is made that there is capacity for the forward clutch 20, in the flow chart of FIG. 6, the process advances from step S21→step S24→step S26→step S27. At step S27, "DN determination" is set as the capacity existence determination result. Also, after "DN determination," even when there is a judgment that there is no capacity for the forward clutch 20, until there is a judgment that there is capacity for the reverse clutch 21, in the flow chart of FIG. 6, the process advances from step S21→step S24→step S26→step S28→step S30. At step S30, the previous determination results, in other words, the "DN determination" is maintained.

When a select operation is done from the N or P range position to the R range position, the reverse clutch engagement control that increases the engagement capacity to the reverse clutch 21 is started. Even when the reverse clutch engagement control is started, until it is judged that there is capacity for the reverse clutch 21, in the flow chart of FIG. 6, the process advances from step S21→step S24→step S26→step S28→step S30. At step S30, the previous determination result, in other words, the "DN determination" is maintained.

When reverse clutch engagement control is started, capacity control is entered from standby control, and it is judged that there is capacity for the reverse clutch 21, in the flow chart in FIG. 6, the process advances from step S21→step S24→step S26→step S28→step S29. With step S29, "RN determination" is set as the capacity existence determination result. Also, after the "RN determination," even when there is a judgment of no capacity for the reverse clutch 21, until it is judged that there is capacity for the forward clutch 20, in the flow chart of FIG. 6, the process advances from step S21→step S24→step S26) step S28→step S30. At step S30, the previous determination result, in other words, the "RN determination" is maintained.

Figure 7:
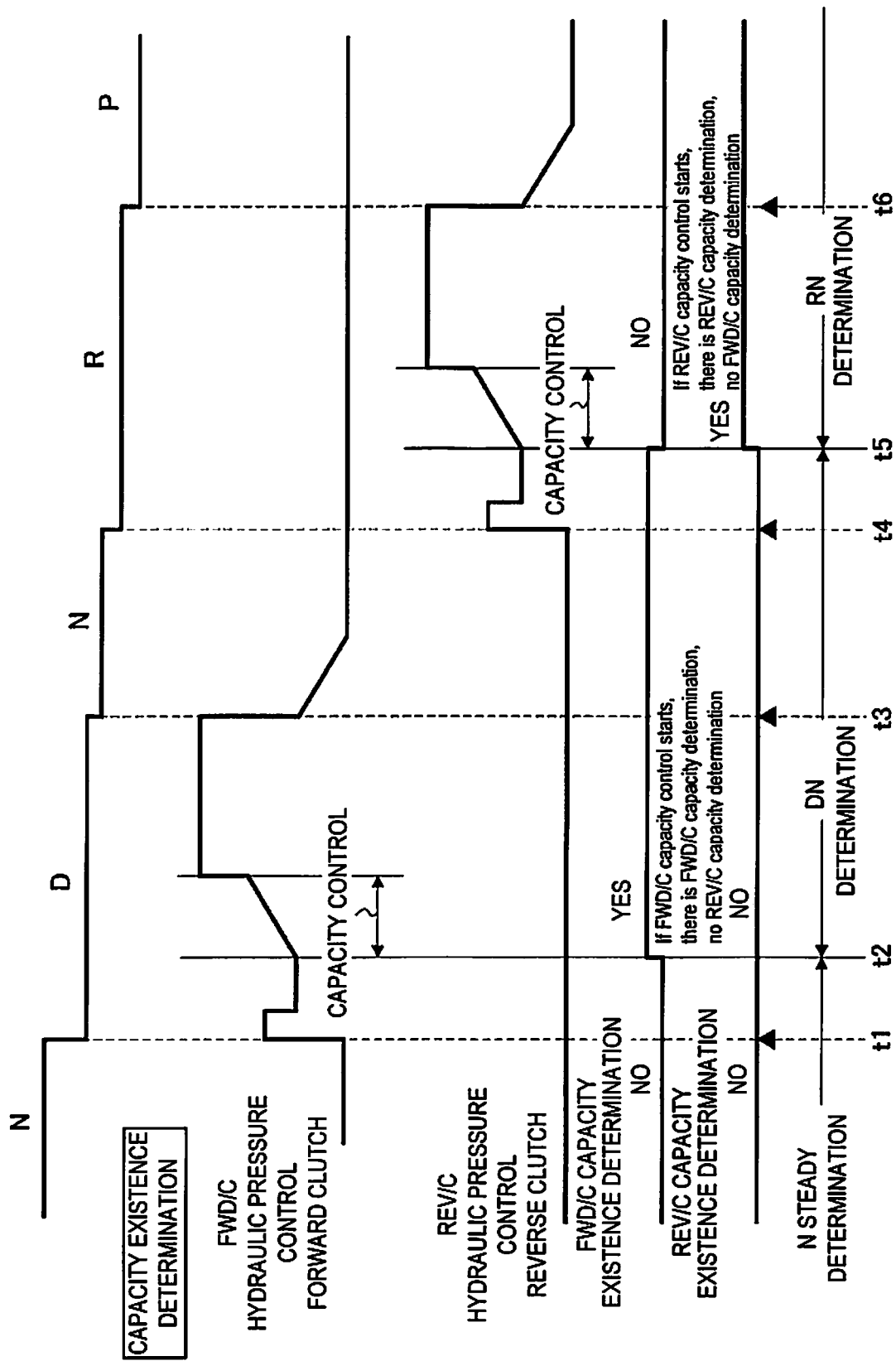
FIG. 7 is a time chart showing the capacity existence determination process operation executed by the AT controller of Embodiment 1.

Next, a specific example of the capacity existence determination operation is explained based on FIG. 7.

For example, when the ON operation of the ignition switch is done from the stopped state in the N range position, and the select operation is performed from the N range position to the D range position at time t1, the pressure input control that increases the engagement capacity of the forward clutch 20 is started.

In the pressure input control of the forward clutch 20, when it becomes time t2 at which capacity control is entered from standby control, the forward clutch 20 has capacity, and the reverse clutch 21 does not have capacity. For this reason, the capacity existence determination switches from "N steady determination" up to time t2 to "DN determination."

After that, when the select operation is performed from the D range position to the N range position at time t3, pressure release control that decreases the engagement capacity of the forward clutch 20 is started. However, even if the forward clutch 20 has no capacity, and the reverse clutch 21 has no capacity, until there is a judgment that the reverse clutch 21 has capacity, the "DN judgment" is maintained.

After that, when the select operation from the N range position to the R range position is performed at time t4, pressure input control to increase the engagement capacity of the reverse clutch 21 is started. In the pressure input control of the reverse clutch 21, when time t5 is reached at which capacity control is entered from standby control, the forward clutch 20 has no capacity, and the reverse clutch 21 has capacity. For this reason, at time t5, the capacity existence determination switches from "DN determination" to "RN determination."

After that, at time t6, when the select operation from the R range position to the P range position is performed, pressure release control that decreases the engagement capacity of the reverse clutch 21 is started. However, even when the forward clutch 20 has no capacity and the reverse clutch 21 has no capacity, until there is a judgment that the forward clutch 20 has capacity, the "RN determination" is maintained.

Select Hydraulic Pressure Control Operation During Continuous Select Operation

Figure 8:
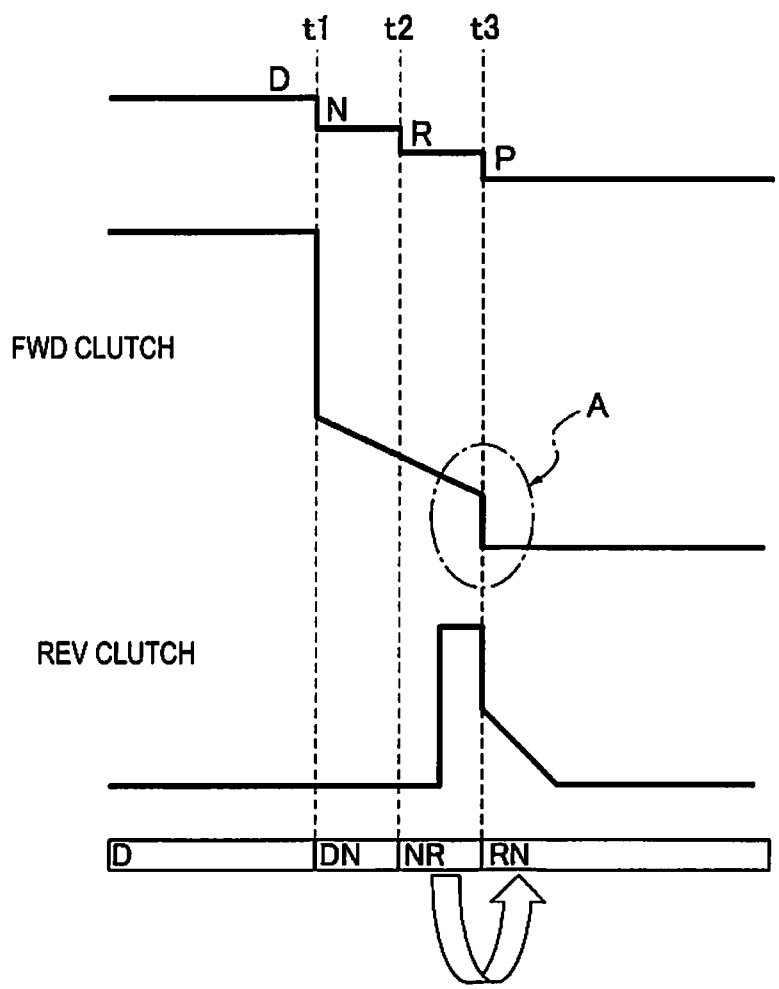
FIG. 8 is a time chart in a comparison example showing each characteristic of lever operation when a continuous select operation of D→N→R→P is performed, FWD clutch hydraulic pressure command value, REV clutch hydraulic pressure command value, determination transition, FWD/C capacity existence determination, and REV/C capacity existence determination.
Figure 9:
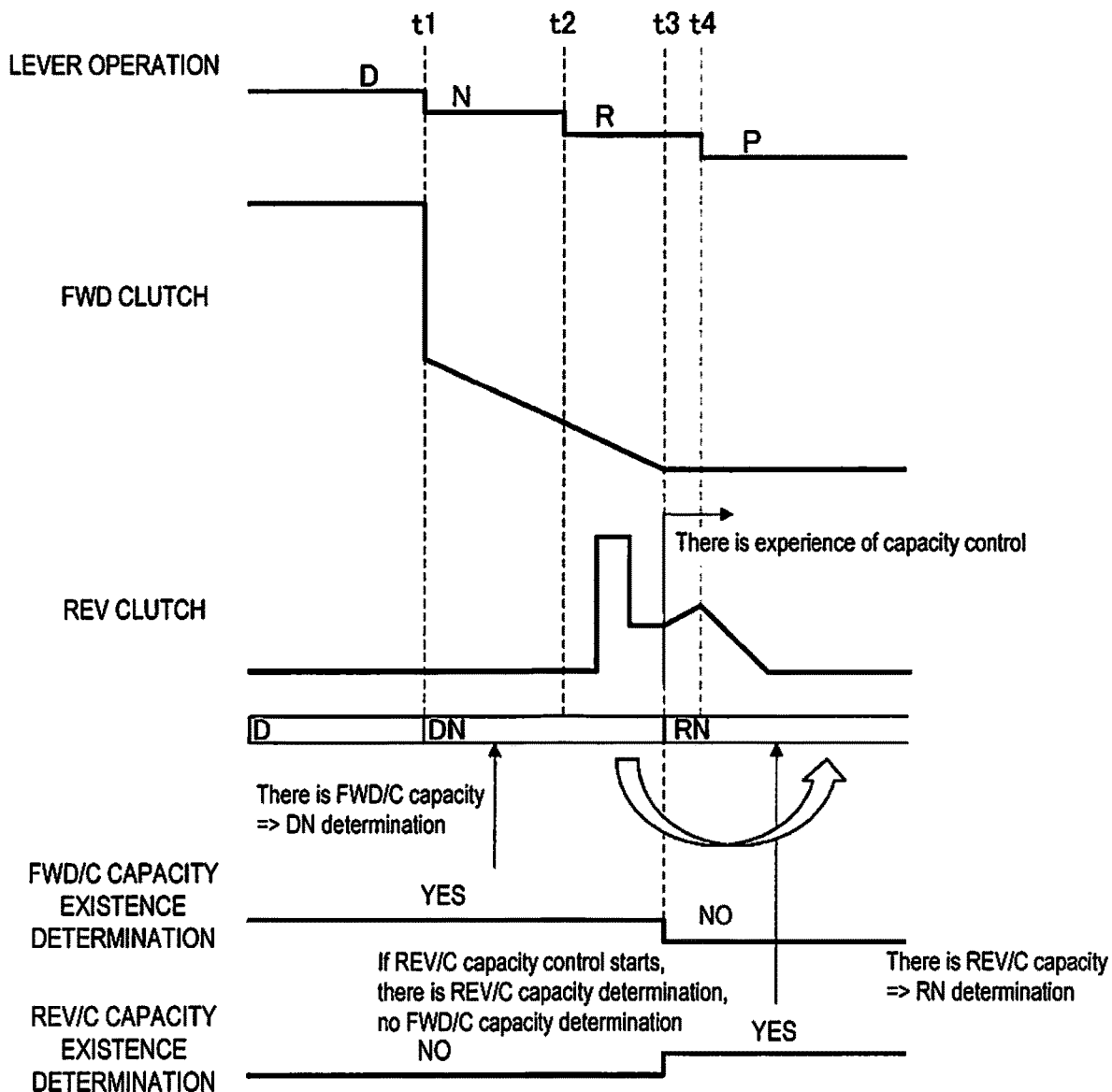
FIG. 9 is a time chart in Embodiment 1 showing each characteristic of lever operation when a continuous select operation of D→N→R→P is performed slowly, FWD clutch hydraulic pressure command value, REV clutch hydraulic pressure command value, determination transition, FWD/C capacity existence determination, and REV/C capacity existence determination.
Figure 10:
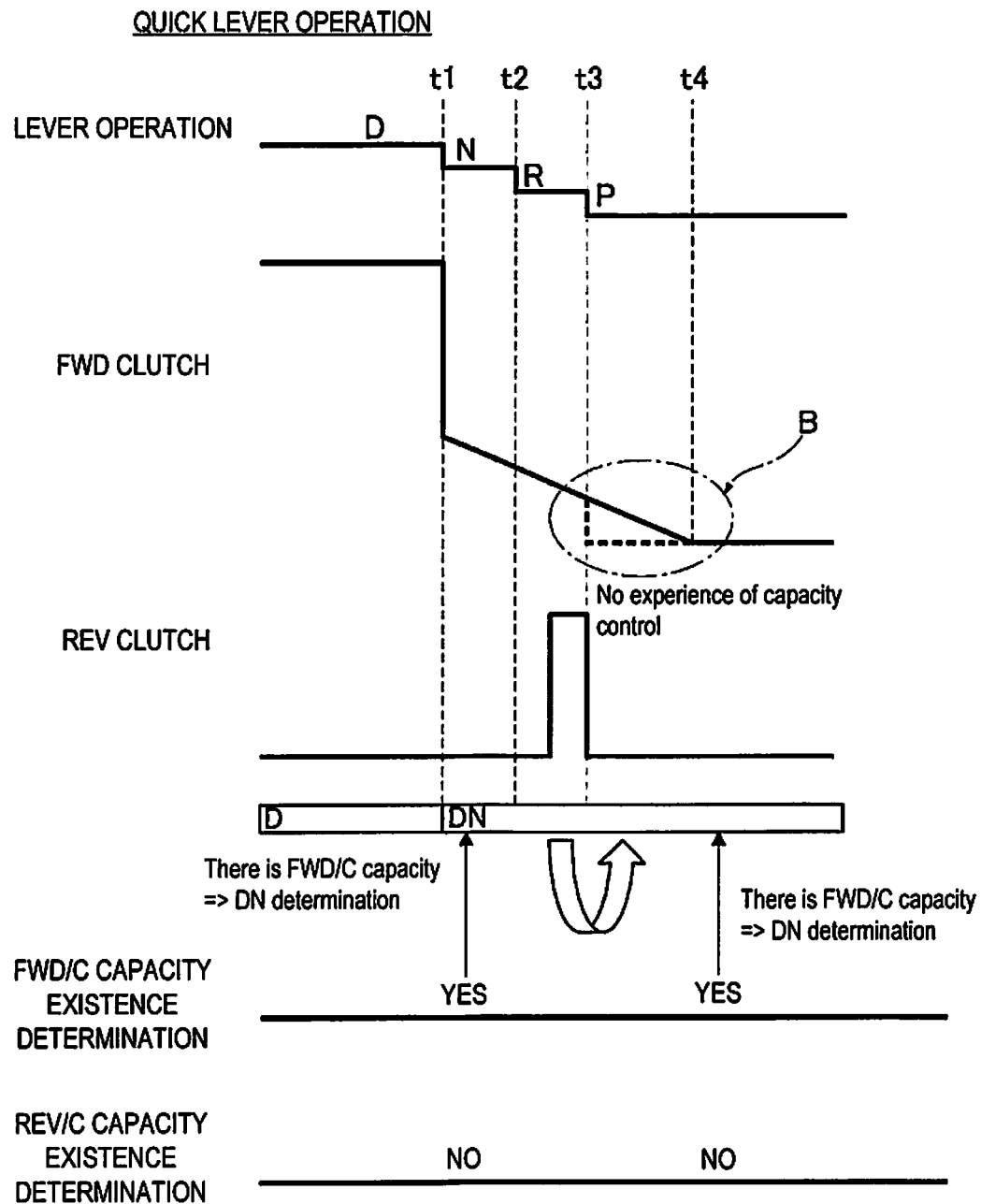
FIG. 10 is a time chart in Embodiment 1 showing each characteristic of lever operation when a continuous select operation of D→N→R→P is performed quickly, FWD clutch hydraulic pressure command value, REV clutch hydraulic pressure command value, determination transition, FWD/C capacity existence determination, and REV/C capacity existence determination.

Hereafter, the select hydraulic pressure control operation when performing the continuous select operation for which the range position detection goes from D→N→R→P by the driver performing an operation of moving the select lever 19 from the D range position to the P range position is explained based on FIG. 8 to FIG. 10.

The select operation mode is judged for each select operation, and an example of performing select hydraulic pressure control according to the select operation mode is used as a comparison example. In this comparison example, the select hydraulic pressure control operation when the continuous select operation of D (first travel range position) to N→R (second travel range position)→P is performed quickly by a lever operation is explained based on the time chart shown in FIG. 8.

First, when at time t1, the range position detection is D→N (first select operation), based on the judgment that this is "DN mode," pressure release control that gently decreases the engagement capacity of the forward clutch that is engaged in the D range position is started. Also, when at time t2, the range position detection is N→R, based on the judgment that this is "NR mode," pressure input control to the reverse clutch (standby control after a delay time) is started. Also, when at time t3, the range position detection is R→P, based on the judgment that this is "RN mode," control for release all at once of the hydraulic pressure of the forward clutch is performed, and control to gently decrease the standby control command to the reverse clutch is started.

Specifically, the "RN mode" is a mode in which the hydraulic pressure of the reverse clutch is slowly decreased in a state with no engagement capacity for the forward clutch. For this reason, when the range position detection is R→P (second select operation) and this is judged as being the "RN mode," since it is necessary to have a state in which there is no engagement capacity in the forward clutch, as shown in the characteristics in the frame of arrow A in FIG. 8, control to have release all at once of hydraulic pressure of the forward clutch is performed.

As a result, when the continuous select operation of switching from the D range position to the P range position is performed by a quick lever operation, the hydraulic pressure of the forward clutch is immediately released, and by the transmission torque to the drive wheel being decreased, select shock occurs.

In Embodiment 1, the select hydraulic pressure control operation when the continuous select operation of D→N→R→P is done slowly by a lever operation is explained based on the time chart shown in FIG. 9.

First, when at time t1, the range position detection is D→N, pressure release control from the forward clutch 20 is started based on the "DN determination." Also, when at time t2, the range position detection is N→R, pressure input control to the reverse clutch 21 (standby control after delay time) is started based on the "DN determination." Also, when at time t3, the capacity of the forward clutch 20 is gone, and it is judged that there is capacity by capacity control being entered for the reverse clutch 21, "DN determination" is switched to "RN determination." Also, when at time t4, the range position detection is R→P, control to gently decrease the capacity control command to the reverse clutch 21 is started based on the "RN determination".

Specifically, at time t3 before time t4 at which the range position detection is R→P, the capacity is already gone for the forward clutch 20. For this reason, based on the "RN determination" with the range position detection being R→P, even if the engagement capacity of the reverse clutch 21 is slowly released, select shock does not occur.

In Embodiment 1, the select hydraulic pressure control operation when the continuous select operation of D→N→R→P is performed using a quick lever operation is explained based on the time chart shown in FIG. 10.

First, at time t1, when the range position detection is D→N, based on the "DN determination," pressure release control from the forward clutch 20 is started. Also, when at time t2, the range position detection is N→R, based on the "DN determination," pressure input control to the reverse clutch 21 (standby control after delay time) is started. Also, at time t3, when the range position detection is R P, based on the "DN determination," control to gently decrease the hydraulic pressure of the forward clutch 20 is started, and at time t4, the engagement capacity of the forward clutch 20 is gone.

Specifically, the "DN determination" is a mode of slowly decreasing the hydraulic pressure of the forward clutch 20 in a state when there is no engagement capacity for the reverse clutch 21. For this reason, when the range position detection is R P, based on the "DN determination," as shown in the characteristics in the frame in arrow B of FIG. 10, pressure release control of slowly decreasing the hydraulic pressure of the forward clutch 20 is performed.

In this way, when the continuous select operation of switching from the D range position to the P range position is performed using a quick lever operation, based on the "RN determination," immediate release control of the hydraulic pressure of the forward clutch 20 is not performed. Instead, by the reverse clutch 21 not experiencing capacity control by a quick lever operation, based on the "DN determination" maintained from time t1 and thereafter, by slowly decreasing the hydraulic pressure of the forward clutch 20, the occurrence of select shock is suppressed.

Characteristic Operation with Select Hydraulic Pressure Control

With Embodiment 1, in the select hydraulic pressure control process, during the select operation from the D/R range position to the N/P range position, pressure release control is executed to gently decrease the engagement capacity of the starting clutch for which it was detected that there is engagement capacity.

For example, when the travel range position is different, when deciding the release element based on the select operation, when there is a D→N select operation, this is the forward clutch 20, and when it is an R→N select operation, this is the reverse clutch 21. However, when the range position detection is D→N→R→P with a quick D→P select operation, engagement capacity remains in the forward clutch 20, engagement capacity is gone in the reverse clutch 21, and at the time of the final R→P select operation, the release element is the reverse clutch 21 which cannot be accommodated.

In contrast to this, rather than deciding the release element based on the select operation, the release element is made to be decided based on the existence of engagement capacity, such as with the starting clutch having engagement capacity during the select operation to the N/P range position.

Therefore, during the select operation to the adjacent range position (D→N, R→N, R→P), the starting clutch that was engaged with the range position before the select operation has engagement capacity, and select shock corresponding to the select operation to the adjacent range position is suppressed.

Furthermore, when the range position goes from D→N→R→P with a quick D→P select operation, regardless of the R→P select operation being the last, there are cases when the forward clutch 20 has engagement capacity. However, when the release element is decided based on the existence of engagement capacity, this also corresponds to this continuous select operation, and select shock is suppressed.

With Embodiment 1, the engagement capacity of the forward clutch 20 and the reverse clutch 21 is observed, and there is a capacity existence determination unit (FIG. 6) that makes a "DN determination" when there is engagement capacity in the forward clutch 20, and makes an "RN determination" when there is engagement capacity in the reverse clutch 21. The select hydraulic pressure control unit (FIG. 5) executes pressure release control according to the determination result of whether "DN determination" or "RN determination" during the select operation from the D range position or the R range position to the N range position or the P range position.

For example, during the select operation from the D/R range position to the N/P range position, it is possible to detect whether there is engagement capacity in the starting clutch that is engaged in the D/R range position by using a hydraulic pressure sensor, etc. However, in this case, it is necessary to judge instantaneously during the select operation using a sensor value from the hydraulic pressure sensor, etc., and it is difficult to set a threshold value for deciding the engagement capacity existence judgment.

In contrast to this, dividing into the select hydraulic pressure control unit (FIG. 5) and the capacity existence determination unit (FIG. 6), in the select hydraulic pressure control unit (FIG. 5), the pressure release control was made to be executed according to the determination results from the capacity existence determination unit (FIG. 6). Therefore, without performing engagement capacity existence judgment for each select operation, pressure release control is executed on the starting clutch with engagement capacity based on the capacity existence determination results.

With Embodiment 1, in the capacity existence determination process, when a "DN determination" is made, "DN determination" continues until the next time the reverse clutch 21 has engagement capacity, and when an "RN determination" is made, the "RN determination" continues until the next time the forward clutch 20 has engagement capacity. In other words, the existence of the engagement capacity is determined by the flipflop determination rule.

For example, this is "DN determination" only during the time that the forward clutch 20 has engagement capacity and the reverse clutch 21 does not have engagement capacity, and this is "RN determination" only during the time that the forward clutch 20 does not have engagement capacity and the reverse clutch 21 has engagement capacity. In this case, during the time that the forward clutch 20 does not have engagement capacity and the reverse clutch 21 does not have engagement capacity, capacity existence determination results are not output. On the other hand, the select hydraulic pressure control is executed independently from the capacity existence determination using the capacity existence determination results, so during the time that capacity existence determination results are not output, select hydraulic pressure control cannot be executed.

In contrast to this, in the capacity existence determination process, by determining the existence of engagement capacity using the flipflop determination rule, the capacity existence determination results are always output. Therefore, even when both the forward clutch 20 and the reverse clutch 21 do not have engagement capacity, execution of the select hydraulic pressure control is ensured using the capacity existence determination results.

With Embodiment 1, in the capacity existence determination process, even when the clutch engagement hydraulic pressure control is started, this is judged as no engagement capacity until the hydraulic pressure control command goes to standby pressure control, and when capacity control that increases the hydraulic pressure control command from the standby pressure control is started, the judgment is that there is engagement capacity.

For example, for the engagement capacity existence determination, it is also possible to perform this using a sensor value from a hydraulic pressure sensor, etc. However, it is necessary to provide the hydraulic pressure sensor, etc., at a position at which the engagement capacity can be judged, and setting the threshold value to decide the engagement capacity existence judgment is difficult.

In contrast to this, using the hydraulic pressure control command with the clutch engagement hydraulic pressure control, when the capacity control to increase the hydraulic pressure control command from standby pressure control is started, the judgment is that there is engagement capacity. Therefore, without needing to provide the hydraulic pressure sensor, etc., and while being low cost, the existence judgment of the clutch engagement capacity is performed with stable timing without variation.

Next, the effect is explained.

The effects listed below can be obtained with the select control device of the automatic transmission 3 of Embodiment 1.

(1) Comprised are the select lever 19 for the driver to select the range position by a select operation, and the controller (AT controller 10).

When the first select operation (D→N) from the first travel range position (D) to the non-travel range position (N) is performed, the controller (AT controller 10) performs pressure release control to gently decrease the engagement capacity of the starting clutch that is engaged at the first travel range position (D).

In the select control device of this automatic transmission 3, the controller (AT controller 10) has the select hydraulic pressure control unit (FIG. 5). After the first select operation (D→N), the select hydraulic pressure control unit (FIG. 5) continues pressure release control during the second select operation (R→P) to the non-travel range position (P) from the second travel range position (R) that is different from the first travel range position (D).

For this reason, when the driver performs the continuous select operation (D→P select operation) that repeats the range position detection of the travel range and the non-travel range, it is possible to suppress select shock.

(2) As the starting clutch, there are the forward clutch 20 for which the engagement capacity is increased when the drive range position (D range position) is selected, and the reverse clutch 21 for which the engagement capacity is increased when the reverse range position (R range position) is selected.

The controller (AT controller 10) has the capacity existence determination unit (FIG. 6) that monitors the engagement capacity of the forward clutch 20 and the reverse clutch 21, and sets "DN determination" when there is engagement capacity for the forward clutch 20, and "RN determination" when there is engagement capacity for the reverse clutch 21.

The select hydraulic pressure control unit (FIG. 5) executes pressure release control according to the determination results of whether the "DN determination" or the "RN determination" during the select operation from the drive range position (D range position) or the reverse range position (R range position) to the non-travel range position (N range position, P range position).

For this reason, in addition to the effect of (1), it is possible to execute pressure release control on the starting clutch which has engagement capacity based on the capacity existence determination results without performing the engagement capacity existence judgment for each select operation.

(3) With the capacity existence determination unit (FIG. 6), the existence of engagement capacity is determined using the flipflop determination rule by which when there is the "DN determination," the "DN determination" continues until the next time the reverse clutch 21 has engagement capacity, and when there is the "RN determination," the "RN determination" continues until the next time the forward clutch 20 has engagement capacity.

For this reason, in addition to the effect of (2), even when both the forward clutch 20 and the reverse clutch 21 have no engagement capacity, it is possible to ensure the execution of the select hydraulic pressure control using the capacity existence determination results.

(4) Even when the clutch engagement hydraulic pressure control is started, the capacity existence determination unit (FIG. 6) judges that there is no engagement capacity until the hydraulic pressure control command reaches standby pressure control, and judges that there is engagement capacity when the capacity control to increase the hydraulic pressure control command from the standby pressure control has started.

For this reason, in addition to the effects of (2) or (3), while having low cost, it is possible to perform existence judgment of clutch engagement capacity at stable timing without variation.

Above, the select control device of the automatic transmission of the present invention was explained based on Embodiment 1. However, for the specific configuration, the invention is not limited to this Embodiment 1, and as long as it does not stray from the gist of the invention of each claim within the scope of claims, design changes, additions, etc., are allowed.

With Embodiment 1, an example is shown of having the capacity existence determination unit (FIG. 6) in the AT controller 10 that performs the select hydraulic pressure control. However, eliminating the capacity existence determination unit, using the forward clutch hydraulic pressure sensor and the reverse clutch hydraulic pressure sensor, during the time of select operation, of the forward clutch and the reverse clutch, which of the clutches has the engagement capacity is detected. Also, it is possible to have an example by which pressure release control is executed that gently decreases the engagement capacity of the clutch for which it is detected that there is engagement capacity.

With Embodiment 1, as the capacity existence determination unit, an example was shown of determining the existence of engagement capacity using so-called flipflop determination rule by which, when there is the "DN determination" or the "RN determination," even if there is no engagement capacity for both the forward clutch and the reverse clutch, the determination result continues. However, it is also possible to have an example with which as the capacity existence determination unit, when the engagement capacity of both the forward clutch and the reverse clutch is gone, a separate determination result is output.

With Embodiment 1, as the capacity existence determination unit, an example was shown of judging that there is no engagement capacity until the hydraulic pressure control command reaches standby pressure control even if the clutch engagement hydraulic pressure control has started, and judges that there is engagement capacity when capacity control is started that increases the hydraulic pressure control command from standby pressure control. However, as the capacity existence determination unit, it is also possible to have an example such one in which the existence of engagement capacity is determined using the forward clutch hydraulic pressure sensor and the reverse clutch hydraulic pressure sensor.

With Embodiment 1, as the automatic transmission, an example was shown of the automatic transmission 3 with nine forward speeds and one reverse speed. However, as the automatic transmission, it is also possible to have an example of the automatic transmission having staged shift stages other than nine forward speeds and one reverse speed. Also, as the automatic transmission, it is also possible to have an example of a continuously variable transmission having a forward clutch and a reverse brake as the starting clutch.

With Embodiment 1, an example was shown of the select control device of an automatic transmission mounted in an engine vehicle, but this is not limited to being an engine vehicle, and it is also possible to apply this as the select control device of an automatic transmission of a hybrid vehicle, an electric car, etc.

The invention claimed is:

1. A select control device for an automatic transmission comprising:
    a select lever configured to select a range position in response to a select operation by a driver; and
    a controller configured to, when a first select operation from a first travel range position to a non-travel range position is performed, perform pressure release control that decreases at a prescribed descending gradient an engagement capacity of a starting clutch that is engaged in the first travel range position, wherein
    the controller has a select hydraulic pressure control unit configured to continue the pressure release control during a second select operation from a second travel range position that is different from the first travel range position to the non-travel range position after the first select operation.

2. The select control device for an automatic transmission according to claim 1, wherein
    the starting clutch is one of a forward clutch for which the engagement capacity is increased when a drive range position is selected, and a reverse clutch for which the engagement capacity is increased when a reverse range position is selected,
    the controller has a capacity existence determination unit configured to monitor the engagement capacity of the forward clutch and the reverse clutch, and to set a "DN determination" when the forward clutch has the engagement capacity, and an "RN determination" when the reverse clutch has the engagement capacity, and
    the select hydraulic pressure control unit is configured to execute the pressure release control according to a determination result of the "DN determination" or the "RN determination" during the select operation from the drive range position or the reverse range position to the non-travel range position.

3. The select control device for an automatic transmission according to claim 2, wherein
    the capacity existence determination unit is configured to determine existence of engagement capacity using a flipflop determination rule by which, once the "DN determination" is made, the "DN determination" continues until the next time the reverse clutch has engagement capacity, and once the "RN determination" is made, the "RN determination" continues until the next time the forward clutch has engagement capacity.

4. The select control device for an automatic transmission according to claim 2, wherein
    the capacity existence determination unit is configured to determine that there is no engagement capacity until a hydraulic pressure control command value reaches a standby pressure value control even when a clutch engagement hydraulic pressure control is started, and to determine that there is engagement capacity when capacity control to increase the hydraulic pressure control command value over the standby pressure value is started.

5. A select control device for an automatic transmission comprising:
    selection means for selecting a range position in response to a select operation by a driver; and
    controlling means for performing, when a first select operation from a first travel range position to a non-travel range position is performed, pressure release control that decreases at a prescribed descending gradient an engagement capacity of a starting clutch that is engaged in the first travel range position, wherein
    the controlling means has select hydraulic pressure controlling means for continuing the pressure release control during a second select operation from a second travel range position that is different from the first travel range position to the non-travel range position after the first select operation.

* * * * *